Dec. 17, 1968　　　　H. B. CALDWELL　　　　3,416,889
PROCESS AND APPARATUS FOR MANUFACTURING PHOSPHORIC ACID
Filed April 19, 1967　　　　　　　　　　　　　　　8 Sheets-Sheet 2

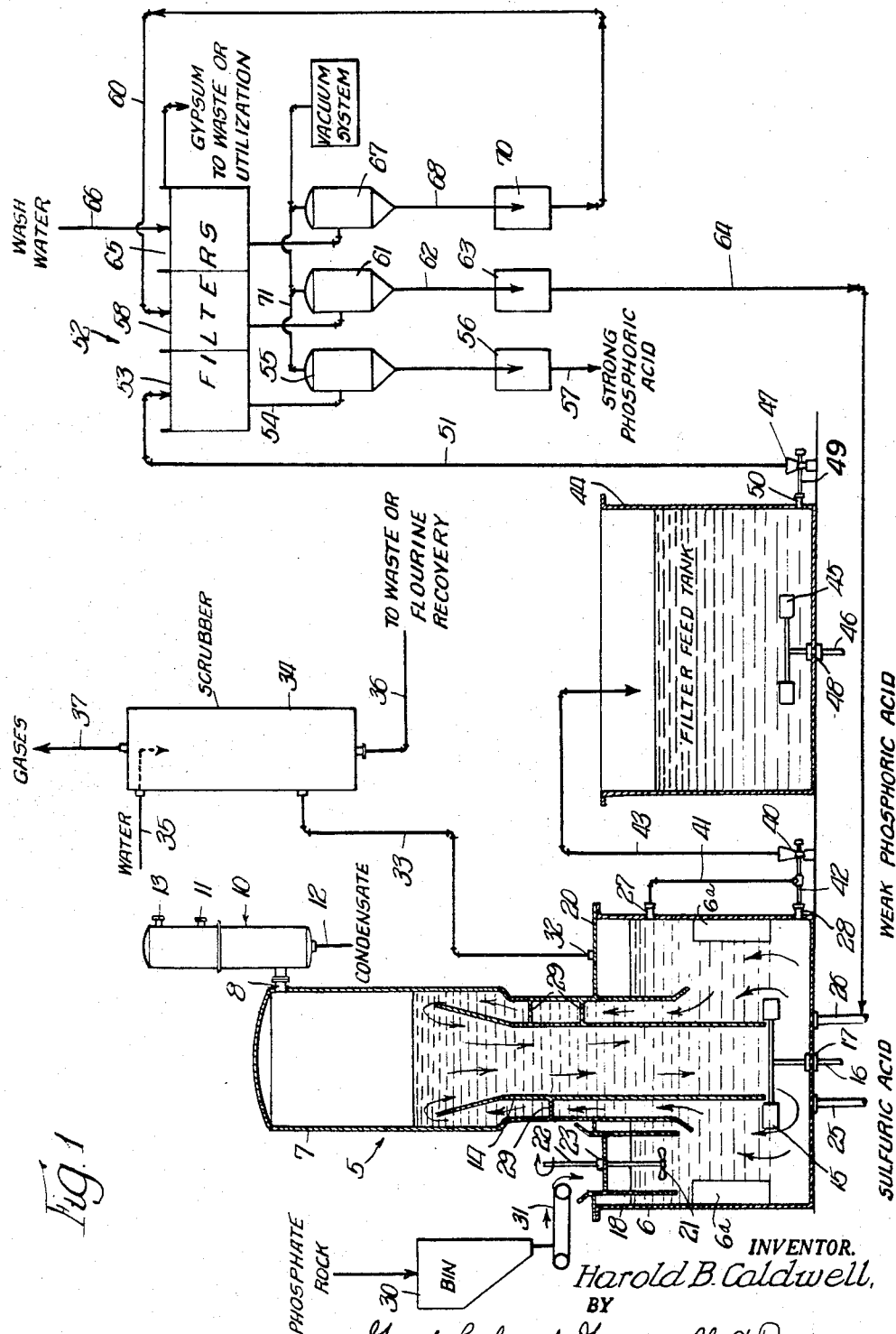

INVENTOR.
Harold B Caldwell,
BY
Greist, Lockwood, Greenawalt, & Dewey
attys

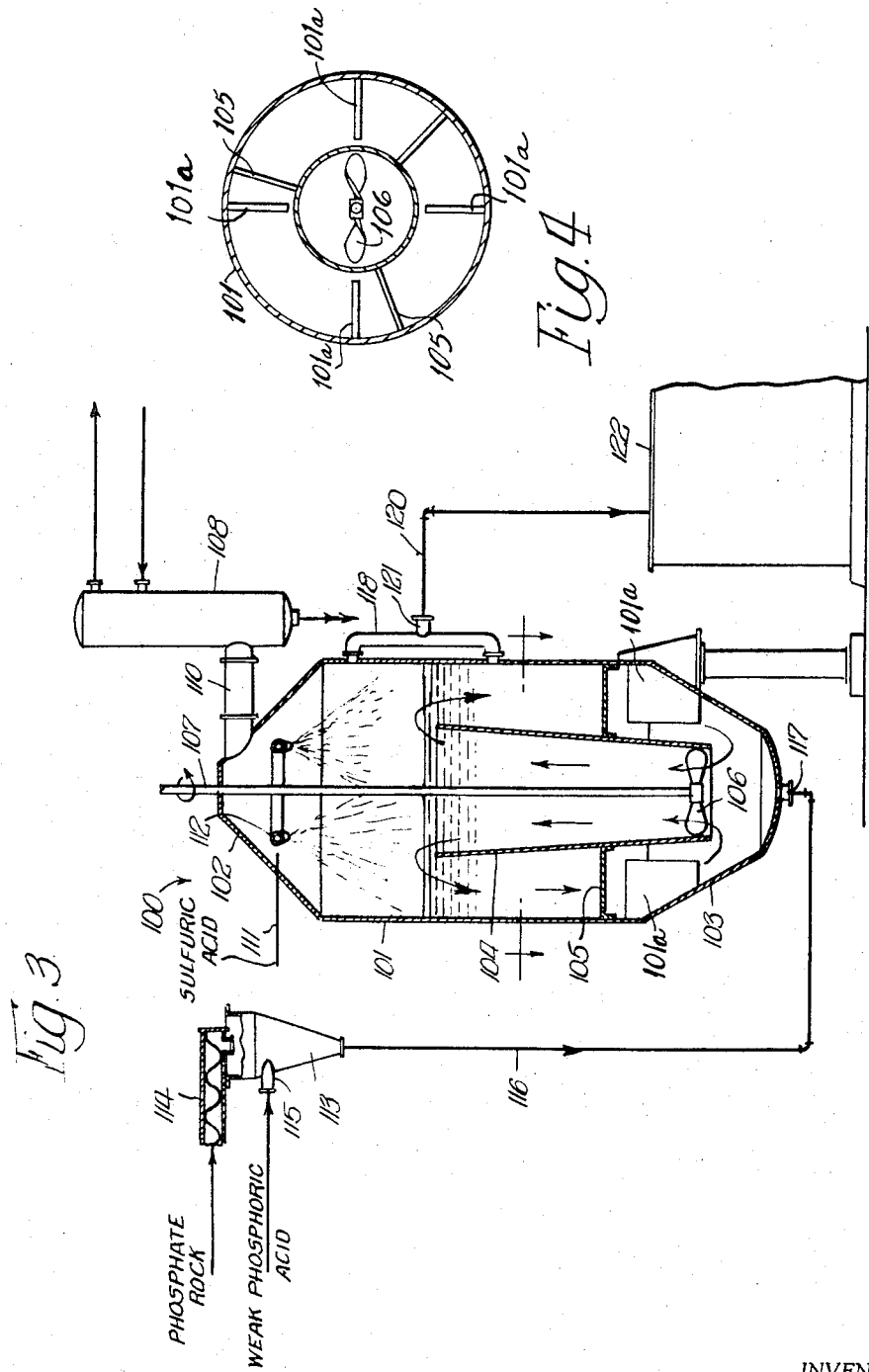

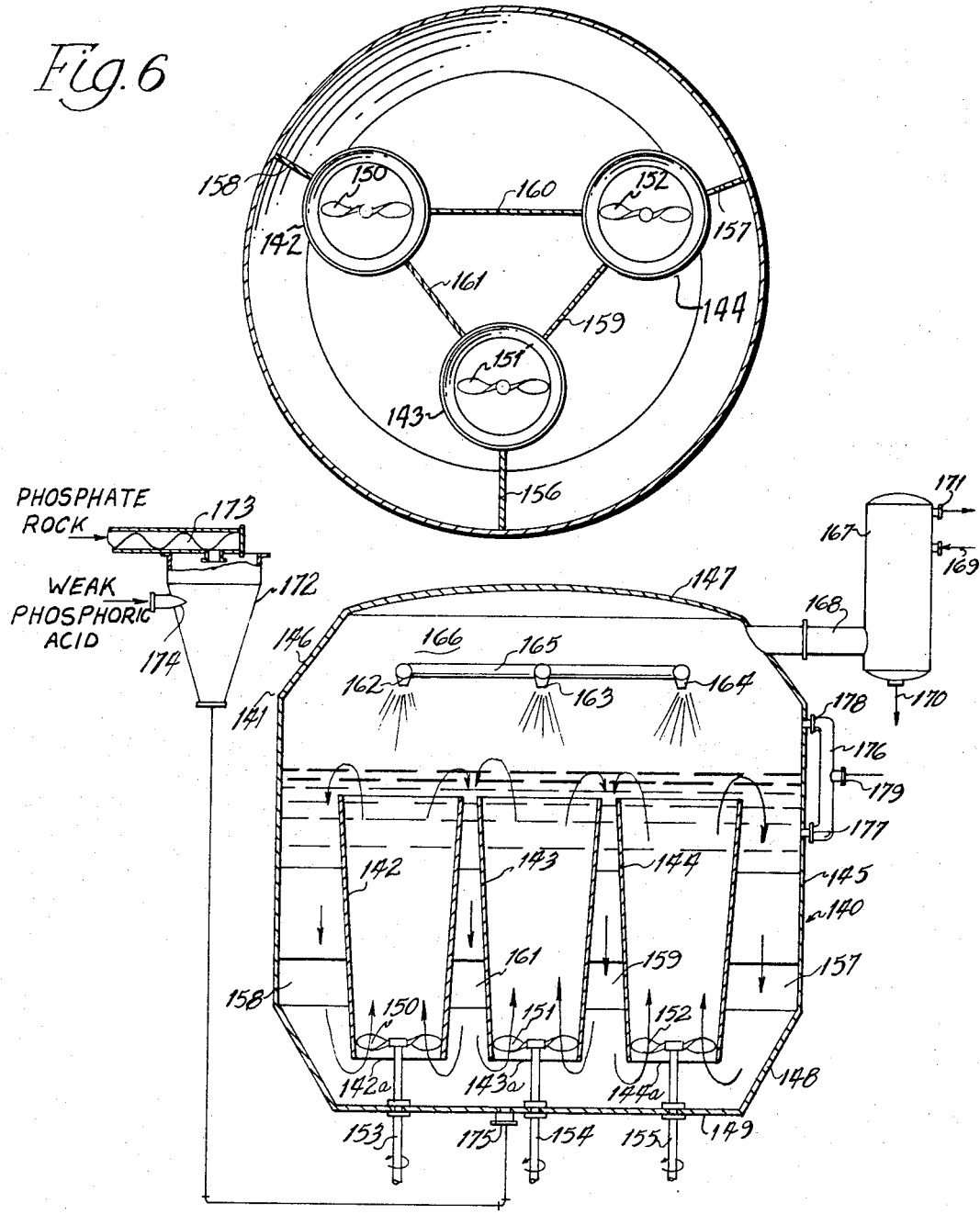

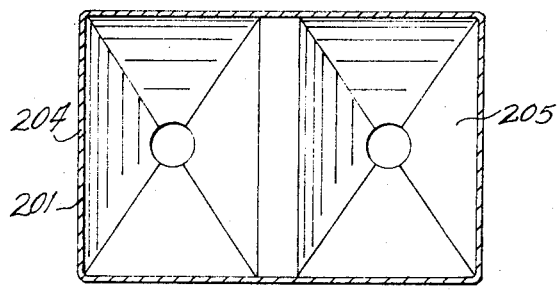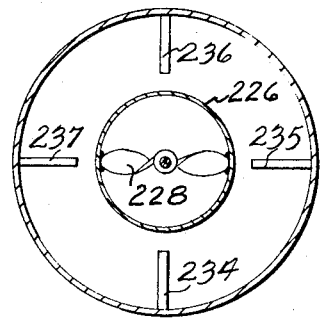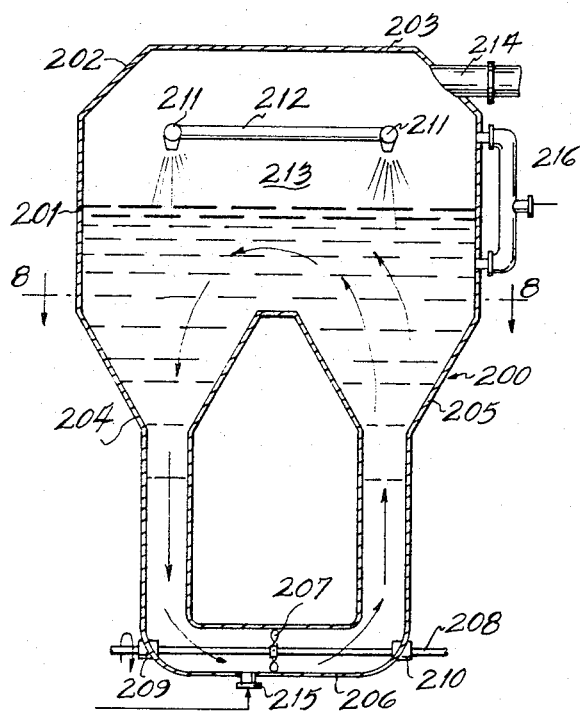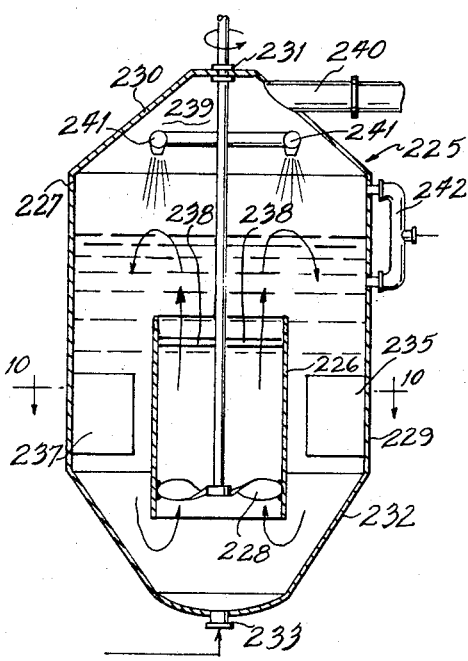

Dec. 17, 1968  H. B. CALDWELL  3,416,889
PROCESS AND APPARATUS FOR MANUFACTURING PHOSPHORIC ACID
Filed April 19, 1967  8 Sheets-Sheet 6

INVENTOR.
Harold B. Caldwell
BY
Greist, Lockwood, Greenawalt, & Dewey
attys.

INVENTOR.
Harold B. Caldwell
BY
Greist, Lockwood, Greenawalt, & Dewey
att'ys

United States Patent Office 3,416,889
Patented Dec. 17, 1968

3,416,889
PROCESS AND APPARATUS FOR MANUFAC-
TURING PHOSPHORIC ACID
Harold B. Caldwell, Sarasota, Fla., assignor to
Whiting Corporation, a corporation of Illinois
Continuation-in-part of application Ser. No. 377,012,
June 22, 1964. This application Apr. 19, 1967, Ser.
No. 632,101
38 Claims. (Cl. 23—165)

ABSTRACT OF THE DISCLOSURE

A method and apparatus for manufacture of phosphoric acid by the wet process wherein the reactants are introduced in a combination reactor and slurry cooler unit which is equipped to continuously circulate the reaction slurry contained therein in a flow pattern adapted to expose substantially the entire body of reaction slurry to a freeboard space in the unit. Subatmospheric pressures being maintained in the freeboard space for providing evaporative cooling of the body of reaction slurry at a rate which is substantially in balance with the rate at which heat is generated in said reaction slurry from exothermic reactions which occur therein. The rate of circulation of said reaction slurry being at least equal to 20% of the total mass of said reaction slurry per minute and preferably within the range of from 100% to 200% of said total mass of reaction slurry per minute. The combined effect of slurry circulation and evaporative cooling providing a substantially uniform level of calcium sulfate supersaturation throughout the body of reaction slurry enabling the production of calcium sulfate crystals which exhibit substantially improved filterability and washability characteristics.

BACKGROUND AND DESCRIPTION OF INVENTION

This application is a continuation-in-part of my copending application entitled, "Process and Apparatus for Making Phosphoric Acid," Ser. No. 377,012, filed June 22, 1964, and now abandoned.

The present invention relates generally to both process and apparatus improvements and innovations in the manufacture of phosphoric acid by the wet process. More specifically, this invention concerns a novel combination wet process phosphoric acid combination reactor and slurry cooler unit and method which utilize vacuum cooling in combination with high circulation rates of the entire body of reaction slurry for providing conditions in the unit which enable the maintenance of substantially uniform levels of calcium sulfate supersaturation throughout the body of reaction slurry. As such, the process and apparatus of the present invention enable the growing of large calcium sulfate crystals which exhibit improved filterability and washability, thereby providing for increased phosphoric acid recoveries at reduced operational costs.

The so-called wet process for the manufacture of phosphoric acid is well known and has been fully described both in technical and patent literature. This process is usually defined as the reaction of tricalcium phosphate with excess phosphoric acid to produce monocalcium phosphate which in turn reacts with sulfuric acid to produce phosphoric acid ($H_3PO_4$) solution and calcium sulfate crystal. A comprehensive description of this process is found in Weber, "Phosphoric Acid, Phosphates, and Phosphatic Fertilizers," pp. 174 et seq. (1952, Reinhold Publishing Corp.). In particular, chapter 12 of this text, starting at page 174, is entitled "The Manufacture of Phosphoric Acid by the Wet Process" and describes in detail the manufacture of wet process phosphoric acid by conventional methods. The bibliography at the end of this chapter also includes references to a number of patents and additional literature on the subject.

In a conventional plant for the manufacture of phosphoric acid by the wet process, there are one or more reactor tanks all of which are equipped with agitators. A flow sheet for such a plant is shown on page 181 of the Weber text, mentioned above, and illustrates several tanks arranged in a cascade system with the first pre-mix tank being at the upper level and the last reactor tank being at the lowest level.

Product losses in a wet process operation for the manufacture of phosphoric acid are related to the filterability and washability of the calcium sulfate crystals produced. In this regard, it is known that recoveries of the phosphoric acid product are inversely proportional to the number of crystals produced and directly proportional to the size of such crystals. Accordingly, it is desirable to produce gypsum crystals which are few in number and large in size.

The process and apparatus of the present invention provide for such a result by cooperatively employing a high rate of circulation of the body of reaction slurry in combination with a controlled rate of evaporative cooling. In particular, this invention involves method and apparatus for circulating the reaction slurry in a combination reactor and cooler unit around a flow directing means in order to expose substantially the entire body of reaction slurry to subatmospheric pressures for effecting evaporative cooling which is maintained substantially in balance with the heat generated through exothermic reactions which occur in the body of reaction slurry. Localized differentials in temperature and concentration are thereby effectively minimized to provide a substantially uniform level of calcium sulfate supersaturation throughout the mass of reaction slurry which reduces the number of nuclei being formed. This factor becomes particularly significant when it is noted that the rate of nucleation increases exponentially, rather than directly, with an increase in supersaturation.

The combined use of vacuum cooling and high circulation rate of the reaction slurry in a predetermined flow pattern accomplishes a new and unexpected result which, for purposes of explanation, may be characterized as an "extended surface." For example, a reactor of cylindrical cross-section used for producing approximtaely 300 tons a day of $P_2O_5$ would have a diameter of approximately 26 feet and an equivalent surface area of approximately 531 square feet. The combined effect of the high circulation rate and vacuum cooling of the reaction slurry in accordance with the present invention, however, cooperate to create a highly turbulent and greatly increased "extended surface" equivalent to a surface area many times the 531 square feet provided by the geometry of the reactor. One important advantage of this "extended surface" is that it significantly enhances uniformity of temperature throughout the body of reaction slurry.

A preferred embodiment of the present invention, more fully described below, involves the atomizing of the sulfuric acid feed to the reactor through pressure nozzles which spray downward onto the "extended surface" of reaction slurry to distribute the acid uniformly onto this extended slurry surface and provide for heretobefore unobtainable uniformity of distribution of the sulfuric acid in the reaction slurry thereby substantially reducing and preventing excessive nucleation in localized areas.

It is, therefore, an object of the present invention to provide an improved process and apparatus for carrying out the manufacture of phosphoric acid by the wet process.

Another object of the present invention is to provide a process and apparatus which enable the production of large and uniform calcium sulfate crystals while carrying out the wet process for the production of phosphoric acid whereby product loses are inherently minimized during filtration and washing of the calcium sulfate crystal cake resulting in both lower operating costs and improved recoveries. In this regard, advantage is taken of the highly important principle of crystal growth which is the control and maintenance of the proper supersaturation level uniformly throughout the entire reaction zone. This value lies within the metastable zone for the particular environment and it has been established that such a value will result in the deposit of solute upon existing crystals rather than the formation of new nuclei.

Another object of the present invention is the provision of a combination reactor and slurry cooler unit utilizing vacuum wherein the power used for agitation is also used for circulation of the reaction slurry within a single vessel whereby power requirements are reduced by as much as two-thirds of the power demand in a conventional wet process installation.

Another object of the present invention is to provide an improved combination reactor and slurry cooler unit for the manufacture of wet process phosphoric acid which employs a flow directing means and flow imparting means which cooperate to provide sufficient high speed circulation of the reaction slurry through such unit at a mass rate at least equal to 20% of the volume of reaction slurry per minute whereby complete recirculation of said reaction slurry will occur at least once every five minutes.

Another object of the present invention is to provide a combination reactor and slurry cooler evaporator unit for carrying out the manufacture of phosphoric acid by the wet process which unit employs a draft tube equipped with a propeller which provides a positive direction and path for high internal circulation and creates and maintains a controlled flow of the entire body of reaction slurry throughout said unit, whereby rapid and uniform dispersion is achieved with close control of supersaturation.

Another object of the present invention is the provision of a combination reactor and slurry cooler unit for carrying out the manufacture of phosphoric acid by the wet process which permits the elimination of recirculation pumps and piping to conduct the reaction slurry to a separate vacuum cooler.

Another object of the present invention is to provide a single-vessel reactor and slurry cooler of the type described wherein the reactants, i.e. phosphate rock, "return" acid (weak phosphoric acid) and sulfuric acid, are introduced into the vessel in a manner which enables the elimination of the usual pre-mix tanks found in conventional installations.

Another object of the present invention is to provide a process and apparatus for carrying out the reactions in the manufacture of phosphoric acid by the wet process with substantially isothermal temperature conditions in the system which closely approximate the average bulk temperature of the reaction slurry (i.e. wherein the temperature at localized areas rarely exceeds the average bulk temperature by more than 1° F.) and with the reaction slurry undergoing a high circulation in a predetermined flow pattern. In this manner a favorable environment for dispersion, reaction, and crystal growth is created with the net result being that there is appreciably less nucleation in the reactor and therefore larger and more suitable calcium sulfate crystal formation and growth giving a slurry with substantially improved filtration and working characteristics and resulting in increased filter capacity and correspondingly reduced phosphoric acid losses with the waste calcium sulfate crystals.

Another object of the present invention is to provide a new and improved process and apparatus for the production of phosphoric acid by the wet process which involves the combined use of vacuum cooling at high circulation rates to provide a substantially uniform level of calcium sulfate supersaturation and temperature throughout the entire body of reaction slurry, said process and apparatus providing evaporative cooling at a rate which is substantially equal to the heat evolved in the exothermic reactions which occur in said body of reaction slurry.

Another object of the present invention is to provide a new and improved process and apparatus for the manufacture of phosphoric acid by the wet process which involves the reaction of phosphate rock and sulfuric acid wherein the sulfuric acid is discharged into a reactor cooler unit through one or more pressure discharge nozzles to provide atomized distribution of said sulfuric acid onto the surface of said body of reaction slurry which is circulating at a high flow rate for effecting substantially uniform distribution of said sulfuric acid throughout said body of reaction slurry to thereby prevent excessive nucleation in said reaction slurry caused by uneven concentrations of sulfuric acid therein.

Another object of the present invention is to provide an improved process and apparatus for carrying out the manufacture of phosphoric acid by the wet process which is simpler to operate and control than conventional installations, and wherein obnoxious fluorine gases produced in the reactions of the wet process are condensed by, and removed with, the condenser water so as to make unnecessary the usual fluorine scrubber system with its duct work, dampers and fans normally required to prevent atmospheric pollution.

Another object of the present invention is to provide an improved slurry and reactor cooler unit for carrying out the manufacture of phosphoric acid by the wet process which occupies less space, requires fewer moving parts and is substantially less expensive to build, operate, clean and maintain than conventional installations thereby substantially reducing capital and operating costs.

Other and further objects of the present invention will be apparent from the following detailed description taken in conjunction with the accompanying drawings wherein:

FIGURE 1 is a diagrammatic view of an installation for producing phosphoric acid by the wet process utilizing principles of the present invention and wherein a combination reactor and cooler unit constituting one embodiment of the invention is shown;

FIGURE 2 is a diagrammatic view of a modified form of the reactor and cooler unit constituting a second apparatus embodiment of the present invention;

FIGURE 3 is a diagrammatic view of a further modified form of the combined reactor and cooler unit constituting a preferred embodiment of the present invention;

FIGURE 4 is a plan sectional view taken along the line 4—4 of the preferred embodiment of the present invention shown in FIGURE 3;

FIGURE 5 is a diagrammatic view of a modified form of the preferred embodiment of the present invention shown in FIGURES 3 and 4 wherein a plurality of draft tubes, each of which is equipped with a separate propeller, are provided in a single combination reactor and cooler unit;

FIGURE 6 is a plan sectional view taken along the line 6—6 of the combination reactor and cooler unit shown in FIGURE 5;

FIGURE 7 is a diagrammatic view of a modified form of apparatus representing a further embodiment of the combined reactor and cooler unit of the present invention;

FIGURE 8 is a plan sectional view taken along the line 8—8 of the apparatus shown in FIGURE 7;

FIGURE 9 is a diagrammatic view of a further modified form of the combined reactor and cooler unit of the present invention wherein the propeller and draft tube rotate together as a unit;

FIGURE 10 is a plan sectional view taken along the line 10—10 of the apparatus shown in FIGURE 9;

Figure 12:
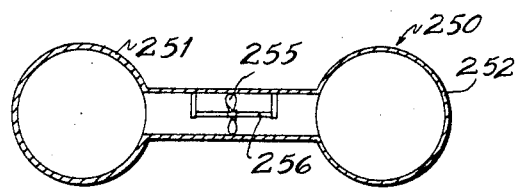
FIGURE 12 is a plan sectional view taken along the line 12—12 of the apparatus shown in FIGURE 11.

Referring to the drawings, and with particular reference to FIGURE 1, a combination reactor and cooler unit is indicated generally at 5 and comprises a tank 6 which is open to the atmosphere having a column 7 projecting above the center thereof. The upper end of column 7 is closed while the lower end dips below the normal operating liquid level within the tank 6 as indicated. Column 7 is provided adjacent the top with a connection 8 which communicates with a vacuum source such as, for example, a direct contact condenser 10 having an inlet 11 in the side for entry of the cooling liquid such as water, a discharge outlet 12 in the bottom, and a vapor outlet 13 adjacent the top for removal of non-condensables.

A draft tube 14 is coaxially supported within column 7 with the upper end of the draft tube terminating adjacent or slightly below the normal operating liquid level within column 7. The bottom end of the draft tube projects downwardly beyond the lower end of column 7 to a location adjacent the bottom of the tank 6 but does not extend all the way to the bottom. An agitator 15 mounted on a shaft 16 is disposed slightly below the bottom end of the draft tube 14. Shaft 16 projects through the bottom of tank 6 to a combination bearing and seal of known type which is generally indicated by the reference numeral 17. The impeller or agitator 15 in operation serves to establish and maintain a generally toroidal flow pattern which is diagrammatically indicated by the arrows. In this regard, it is preferred that the bottom end of the draft tube 14 extend to a location sufficiently close to the bottom of the tank 6 so as to prevent short circuiting of the flow of reaction slurry. At the same time, the bottom end of draft tube 14 should also be sufficiently distant from the bottom of the tank so as to provide for efficient use of power to circulate the reaction slurry at a given rate. In the illustrated embodiment, it is generally preferred that in wet process phosphoric acid systems of the present invention that the distance between the bottom end of the draft tube and the bottom of tank 6 be approximately equal to one-half the diameter of the agitator 15.

As is generally shown by the arrows, the liquid flows downwardly through the draft tube 14 and then spreads radially outwardly over the central area of the bottom of the tank and then upwardly into the annular space between draft tube 14 and the interior of column 7. A plurality of vane members 6a are used to prevent circulation of the reaction slurry as a single mass or body in a circular path within the body of the tank 6.

Phosphate rock is introduced into the tank 6 through a well which is defined by a sleeve 18 the open bottom end of which dips below the normal operating level of liquid within tank 6. The upper end of sleeve 18 projects above the tank cover 20. Well or sleeve 18 is provided with an agitator comprising an impeller 21 mounted on the lower end of the shaft 22 which is journaled in a bearing 23 mounted on a plurality of spokes 24. The impeller shafts 16 and 22 are supported and driven in known manner.

Tank 6 is provided at the bottom with an inlet connection 25 for sulfuric acid and another inlet connection 26 through which weak phosphoric acid is introduced in the circulating body of reaction slurry. Adjacent the top, tank 6 is provided with a side outlet connection 27 on the side opposite the well of sleeve 18 and at a height just below where it is desired to establish the operating liquid level within the tank 6. An auxiliary outlet connection is provided at 28 adjacent the bottom of the tank.

Phosphate rock is stored in a bin 30 from which it may be gravity fed in known manner unto a horizontal belt conveyor 31 for discharge into sleeve 18.

The cover structure 20 may be used as the support for the column 7 and sleeve 18 while the draft tube 14 is supported within the column 7 by a plurality of spokes 29. Other means of support will be apparent to those skilled in the art.

Gases which may be emitted from the freeboard space in the top of the tank 6 are discharged to a vent 32 which is connected by a line 33 to the inlet of scrubber 34 which, in the illustrated embodiment, is provided at the top with a shower of cold water or other suitable scrubbing solution through the line 35. Fluorine and other soluble gases are absorbed into scrubbing solution and are thereby removed from the bottom of the scrubber 30 through a line 36 for subsequent discharge to waste or fluorine recovery. Harmless non-condensable gases are vented through the top of the scrubber through a vapor outlet line 37.

A pump 40 serves to withdraw reaction slurry from the tank 6 at the outlet connection 27 through a pipe 41 which connects with a pipe 42 one end of which is connected with the suction inlet of a pump 40 and the opposite end of which is connected with a tank outlet 28. The discharge connection of the pump 40 communicates with a line 43 which discharges the reaction slurry into a filter feed tank 44. An agitator 45 is provided in filter feed tank 44. Agitator 45 is mounted on the upper end of a shaft 46 which passes through a seal 48 and is driven in known manner. As such, agitator 45 serves to keep the contents of filter feed tank 44 uniformly dispersed.

Reaction slurry is removed at a uniform rate from filter feed tank 44 by a pump 47 the inlet connection of which communicates by means of a line 49 to an outlet 50 adjacent the bottom of the sidewall of the tank 44. Pump 47 discharges reaction slurry through a line 51 into the first stage of a series of filters—three being shown and indicated generally by the reference numeral 52. In the first filter 53, strong phosphoric acid is drawn off through the bottom of the line 54 into a chamber 55 maintained under vacuum. Strong phosphoric acid collects in a tank 56 from which it can be removed as desired through the line 57. Reaction slurry, from which a substantial portion of the strong phosphoric acid has been removed, passes from the filter unit 53 into the second filter unit 58 which also receives wash water from the last filter through a line 60. Weak phosphoric acid is drawn off from the filter 58 into a suction or vacuum vessel 61 and flows through line 62 into a receiver 63 from which it is recycled as "return" acid by way of line 64 to the inlet connection 26 in the tank 6.

Slurry passes from the filter unit 58 into the last shown filter unit 65 into which wash water is added through a feed line 66. The washed calcium sulfate crystals are discharged from the last filter 65 either to waste or to any other desired utilization. The wash water from filter unit 65 is drawn into vacuum receiver 67 and passes from the bottom thereof into a receiver 70 through a line 68. Return line 60 communicates receiver 70 with the intermediate1 filter unit 58 in the manner previously described. All of the vacuum receivers 55, 61 and 67 can be connected to a common header 71 and a vacuum source as is shown.

In operation, phosphate rock is continuously fed into the reactor through the well 18, sulfuric acid is introduced through the inlet connection 25 and weak phosphoric acid is introduced into the inlet connection 26. The amount of sulfuric acid added is such as to normally maintain approximately 2% free sulfuric acid in the reaction slurry as withdrawn through the outlet connection 27. A vacuum is created in the headspace at the upper end of the column 7 by means of the condenser 10 and the impeller 15 is operated so as to maintain the path of circulation generally indicated by the arrows and described above.

When the combination reactor and cooler unit is properly operated, the cooling effect created by the condenser 10 as it draws a vacuum in the upper end of column 7 and produces a vaporization from the surface of the liquid which is sufficient to offset the heat generated by the exothermic reactions occurring within the reactor-cooler unit. These exothermic reactions include both the heat evolved in the wet process chemical reactions which take place as well as the heats of solution. The circulation established by the impeller 15 should be sufficient so that the contents of the unit are maintained at substantially uniform temperatures throughout to avoid localized high temperature zones within the reactor-cooler unit 5. In this regard, it has generally been found that such circulating rates throughout the system should be at least sufficient as to enable recirculation of the entire mass of reaction slurry through the combination reactor and cooler unit 5 at least once every five minutes. Preferably, circulation rates of from approximately 100% to approximately 200% of the total mass of reaction slurry per minute will enable advantageous use of the previously mentioned "extended surface" principle of the present invention.

The following working example will serve to further illustrate the nature of the invention in the manner in which the combination reactor and cooler unit is operated.

EXAMPLE 1

The tank 6 and filter feed tank 44 are each approximately 18 feet in diameter, 20 feet high and the liquid level in the tank 6 is maintained at a height of 15 feet. The column 7 is projected 30 feet above the top cover 20 and has a diameter of 10 feet at the upper end and a reduced diameter of 9 feet at the lower portion. The draft tube 14 is 6½ feet in diameter and projects down to within 24 inches of the bottom of the tank 6. The normal liquid level within the column 7 in operation is 36 feet above the bottom of the tank 6. The condenser 10 produces 22 to 24 inches of vacuum within the headspace of the column 7.

Crushed phosphate rock are introduced by the conveyor 21 at the rate of 14 tons per hour. A concentrated (98%) sulfuric acid feed is introduced into the tank 6 at the rate of 26 gallons per minute while weak phosphoric acid having a strength of from approximately 18% to 20% is returned through the connection 26 at the rate of approximately 97 gallons per minute. The substantially uniform temperature of the liquid contents within the reactor cooler unit 5 are thereby maintained in the range of from approximately 160° to 170° F. and the change in temperature of the liquid at the interface of the column 7 will be less than 1° F.

Reaction slurry containing crystals of calcium sulfate dispersed in strong phosphoric acid are withdrawn through the outlet 27 at the rate of 125 gallons per minute. The pump 47 withdraws the reaction liquid or slurry from the filter feed tank 44 at a rate equal to 125 gallons per minute and discharged the same into the filter 52. Wash water at the rate of 78 gallons per minute is introduced through the line 66 and 2400 gallons of phosphoric acid having a concentration of from about 43% to 44% $H_3PO_4$ are produced each hour along with 41,000 pounds of calcium sulfate crystal (dry basis) per hour.

It will, of course, be understood that the reaction conditions in the combination reactor and cooler unit 5 can be varied within appropriate ranges. For example, the temperature of the reaction slurry can easily range from 140° to 225° F., the vacuum maintained in the freeboard space of the evaporator column 7 may range from approximately 26.5 to 10 inches.

In FIGURE 2, a modified form of the combination reactor and cooler unit is shown and indicated generally by the reference numeral 75. As is illustrated, a tank 76 is provided with a vertically disposed column 77 positioned adjacent one side thereof. Mounted within the column 77 is a draft tube 78, the lower projecting end 80 of which is curved as shown so that the bottom end thereof is approximately concentric with the tank 76. In this embodiment, an impeller 81 is supported on the bottom end of a drive shaft 82 which extends through the tank and communicates with a suitable power driving means. The flow pattern is generally the same as in the combination reactor-cooler unit 5 shown in FIGURE 1 in that the reaction slurry travels down through the draft tube 78 and then flows upwardly through the annular space between the tube 78 and column 77 as is generally indicated by the arrows. Vane members 76a are provided to prevent the reaction slurry from rotating around the axis of shaft 82. Phosphate rock is introduced through the sleeve 83 which, in the illustrated embodiment, is provided with an agitator 84. Sulfuric acid is introduced through the feed line 85 which projects down through the reaction slurry in tank 76 and discharges the sulfuric acid at a location adjacent the lower end of draft tube 76. Return weak phosphoric acid is introduced through the line 86 which also discharges at a location adjacent the lower end of draft tube 78. In the illustrated embodiment the lower end of the return phosphoric acid line 86 is shown to be slightly above the bottom end of the sulfuric acid feed line 85.

A condenser 87 is provided for maintaining a vacuum in the headspace of column 77.

In general, the combination reactor and cooler unit 75 operates in the same manner as previously described in connection with the reactor and cooler unit 5. That is, the phosphate rock, sulfuric acid and weak phosphoric acid are continuously introduced at the desired rates. The condenser 87 operates to provide evaporative cooling at a rate which is substantially equal to the rate of heat developed through the exothermic reactions which occur within the tank 76. This vacuum cooling effect in combination with the high speed agitation developed by impeller 81 acts to provide substantially uniform temperatures throughout the mass of reaction slurry and thereby provide the previously discussed "extended surface" operating principle of the present invention. Reaction slurry is continuously drawn onto the outlet connection 88 and discharged into a filter feed tank 89 for further processing in accordance with a known manner such as, for example, in accordance with the manner described in connection with FIGURE 1.

FIGURES 3 and 4 generally illustrate a further modification and preferred embodiment of the combination reactor and cooler unit of the present invention which is generally designated by the reference numeral 100. In this regard, it will be noted that the embodiment shown in FIGURES 3 and 4 is formed of a single outside vessel or shell 101 having frusto-conical top and bottom end portions 102 and 103, respectively. On the other hand, units 5 and 75 were provided with separate reactor tanks (6 and 76 respectively), each of which included a vertically extending column which projected thereabove (columns 7 and 77 respectively).

As is best shown in FIGURE 3, combination reactor and cooler unit 100 is provided with a tapered draft tube 104 coaxially supported on the interior of the vessel 101 by means of a plurality of spoke members, each of which is designated by the reference numeral 105. An impeller 106 fixed to the lower end of a drive shaft 107 is located in the lower and narrower end of the draft tube 104 while the shaft 107 projects through the top of frusto-conical top section 102. In the illustrated embodiment, the blades of impeller 106 will operate to draw reaction slurry upwardly and through the draft tube 104 and then along the outer periphery of said draft tube between the annular space defined by the outer surface of draft tube 104 and the inner surface of the vessel 101. The distance between the bottom end of draft tube 104 and the bottom of the frusto-conical section 103 preferably is approximately equal to one-half of the propeller diameter. This spacing between these components of the system provide a desirable balance between the power required to circulate the reaction slurry and the amount of short circuiting or deviation from the generally toroidal flow pattern of the circulating reaction slurry. By polishing the bottom of tapered draft tube 104 closer to the bottom end of frusto-conical section 103 the likelihood of short circuiting of the flow of reaction slurry in the reactor is minimized. On the other hand, by positioning the bottom of tapered draft tube 104 further from the bottom of frusto-conical section 103 power requirements to circulate the reaction slurry at a given rate are reduced. In this regard, it should be noted that the precise location of the draft tube will often depend upon the configuration of the flow directing means and of the vessel itself and that the suggested preferred relationship of one-half the propeller diameter merely represents the preferred distance for a circular draft tube placed within a reaction vessel of the general configuration shown in FIGURES 3 and 4.

The upper end of draft tube 104 is preferably located slightly below the liquid level in the combination reactor and cooler unit. It is possible, however, to operate this unit with the upper end of the draft tube 104 extending slightly above the liquid level since the flow through the draft tube in such a case would merely flow around the upper end of the draft tube 104 and down into the reaction slurry, however, in such arrangements horsepower requirements are increased. A plurality of vane members 101a are provided for preventing the body of reaction slurry from rotating as a unified mass around the interior of combination reactor and cooler unit 100.

A vacuum is maintained in the upper end of the combination reactor and slurry cooler unit 100 by means of a suitable condenser 108 which communicates with the freeboard space above the reaction slurry in the vessel through a suitable connection 110. Inlet 108a of condenser 108 receives a suitable cooling liquid such as, for example, cold water which in accordance with known techniques operates to condense the condensable materials in condenser 108 for discharge through a suitable outlet 108b while non-condensable materials are discharged through the outlet 108c.

Concentrated sulfuric acid is delivered into the unit 100 through a conduit 111 which projects into the upper section 102 and carries an annular spray head 112 having discharge openings located on the bottom thereof so that the incoming acid is efficiently sprayed and distributed throughout the interior of the freeboard space of the vessel 101 for uniform distribution into the body of reaction slurry which is simultaneously circulating in accordance with the principles of the present invention to provide the advantageous "extended surface" principle.

Phosphate rock and return acid are continuously fed into an outside mixing hopper 113. As is shown, the rock is introduced by means of a screw conveyor 114 while the acid is introduced below the top of the hopper 113 through a side connection 115. This arrangement serves as a means for efficiently mixing the rock with the return acid to form a slurry which is withdrawn from the bottom of the hopper 113 through the line 116 and introduced through a connection 117 into the lower or bottom section 103 of the unit 100.

Reaction slurry is continuously discharged from combination reactor and slurry cooler unit 100 through a vertical side tube 118 provided in the vessel 101. As is shown, the bottom end of side tube 118 communicates with the vessel 101 below the normal liquid operating level thereof and the upper end of 118 communicating to the freeboard space above such normal operating liquid level. A conduit 120 leads from a connection 121 at approximately the normal operating level and the reaction slurry is continuously discharged into a filter feed tank 122 for further processing such as, for example, in the manner described in connection with FIGURE 1.

The combination reactor and cooler unit 100 operates in the same general fashion of units 5 and 75 of FIGURES 1 and 2, respectively. In particular, the reactants are continuously delivered to and fed into the vessel 101 while reaction slurry continuously discharges through the outlet line 120 so as to maintain the established operating level. The fresh concentrated sulfuric acid is efficiently and uniformly distributed over the circulating reaction slurry so as to provide substantial uniformity of concentration throughout the body of reaction slurry to minimize excessive nucleation in accordance with the principles of this invention. Furthermore, the surface of the reaction slurry will normally be turbulent due to the vapor flash with the result that the actual surface in the reaction slurry will, in effect, be many times the cross-sectional area of the vessel 101. A foam phase will tend to exist above this slurry and the sulfuric acid spray may partially destroy the foam. If desired, water for dilution may be added to the concentrated sulfuric acid prior to its being sprayed into the upper end of the reaction vessel, such being readily permitted by the arrangement shown.

The slurry of phosphate rock and return acid is introduced at the bottom of the reaction vessel 103 where the turbulence is maximum so that this slurry is quickly and uniformly blended with the contents of the reactor vessel to further enhance uniformity of concentration throughout the mass of reaction slurry.

The conditions within the combination reactor and cooler unit 100 are optimum for permitting the reaction of the wet process to be carried out in a manner by which substantial uniformity of temperature and concentration can be maintained throughout the entire body of reaction slurry so as to prevent excess nucleation and thereby provide for formation of calcium sulfate crystals of a favorable size which can be easily filtered and washed to provide increased product recoveries at reduced operating costs. Furthermore, the combination reactor and cooler unit 100 is advantageously constructed so that inactive zones or pockets are eliminated to prevent the formation of localized areas of reaction. In this regard, it has been found that scale formation on the interior reactor walls is held to a minimum and extended periods of operation are permitted without necessitating shutdown for removal of such scale.

EXAMPLE 2

This example will serve to illustrate the construction and operation of an isothermal reactor relation in accordance with the preferred embodiment of this invention as shown and described in connection with FIGURES 3 and 4. The combination reactor and cooler unit may have a height of approximately 35 feet with a cylindrical section having a diameter of approximately 16 feet. Operating conditions may be summarized as follows for an installation having a capacity of approximately 100 tons per day (t.p.d.) of $P_2O_5$:

Phosphate rock is introduced through the conveyor 114 into the hopper 115 at a rate of approximately 325 t.p.d. while 690 t.p.d. of return acid are introduced at the rate of 97.5 gallons per minute (g.p.m.). Resultant slurry is fed at the rate of 118 g.p.m. through the line 116 into the bottom of vessel 101.

284 t.p.d. of 98% sulfuric acid are introduced into the line 111 at the rate of 25 g.p.m. The impeller 106 is driven at a rate of 100 revolutions per minute (r.p.m.) by a 50 to 75 horsepower motor to provide an approximate flow rate of reaction slurry of approximately 50,000 g.p.m. Reaction slurry having a suspended solids concentration of approximately 40% by weight is withdrawn through line 120 at a rate of 125 g.p.m. which is equal to approximately 1200 t.p.d. The condenser 108 is operated so as to maintain a vacuum within the headspace. Under the foregoing conditions, the retention time within the reactor unit is approximately four hours. It will be understood that reaction slurry is filtered and otherwise processed in a suitable manner such as described in connection with FIGURE 1.

FIGURES 5 and 6 generally illustrate a modified form of the preferred embodiment of the present invention previously described in connection with FIGURES 3 and 4. As is shown, this embodiment of the combination reactor and cooler unit 140 includes a single outside closed vessel or shell 141 which is equipped with a plurality of draft tubes 142, 143 and 144. The use of a plurality of such draft tubes enables reduction in overall height of the vessel as well as that of the individual draft tubes and is preferred where equipment size becomes so large that it is impractical to use a single propeller. As such, the combination reactor and cooler unit constructed in accordance with this embodiment of the present invention provides for the production of large quantities of phosphoric acid at installation costs which are significantly lower than the cost of constructing multiple units of the type shown and described in connection with FIGURES 3 and 4.

In the illustrated embodiment, closed vessel or shell 141 is provided with a fixed diameter section 145 having an upper end which extends into a frusto-conical top 146 which in turn is closed off by a domed section 147. The lower portion of fixed diameter midsection 145 extends into a frusto-conical bottom 148 and is closed off at its bottom end by a flat plate member 149. Each of the draft tubes 142, 143 and 144 is of a generally tapered construction and has a bottom portion 142a, 143a and 144a, respectively, which terminates at a location adjacent the bottom plate 144 at a distance therefrom which minimizes short circuiting of the reaction slurry without incurring excessive power requirements. In this regard, with draft tubes of a circular cross-section, it is preferred that the bottom portions thereof be spaced a distance approximately one-half of the equivalent propeller diameter from the bottom plate 149. This value is obtained by ascertaining the diameter of a single impeller which would provide a flow equal to the combined flow of each of the individual impellers 151 and 150 and dividing this value by 2. Of course, it will be appreciated that variations from this value can be employed without departing from the scope of the present invention, the preferred spacing merely representing a desirable balance between power requirements and minimal short circuiting of the fluid flow for the particular geometry of these draft tubes.

Separate impellers 150, 151 and 152 are located in each of the draft tubes 142, 143 and 144. These impellers are respectively mounted to drive shafts 153, 154 and 155 and are operated so that they draw liquid from the bottom of the vessel and move it upwardly through the respective draft tubes to provide a generally toroidal flow pattern of the reaction slurries as is generally depicted by the arrows.

Draft tubes 142, 143 and 144 are mounted to a network of vane members 156–161 which both rigidly support the respective draft tubes and act to prevent the body of reaction slurry from circumferentially moving about the interior of the unit 141. The upper ends of the respective draft tubes are preferably positioned slightly below the operating level of the reaction slurry for economic reasons. If desired, these tubes can extend slightly above the operation slurry level with the only disadvantage resulting being that power requirements will be somewhat increased thereby.

In accordance with the present invention, each of the impellers is operated at a speed which provides for rapid circulation of the reaction slurry through the body of the unit 141. In this regard, the speed of the impellers should provide a mass flow of at least approximately 20% of the entire volume of reaction slurry per minute and preferably would provide a mass flow of from 100% to 200% of the entire mass of reaction slurry per minute. Additionally, as is best illustrated in FIGURE 5, concentrated sulfuric acid is discharged onto the rapidly circulating mass of reaction slurry through a plurality of pressure nozzles 162, 163 and 164 which in the illustrated embodiment are concentrically spaced above each of the draft tubes 142, 143 and 144 and connected by a common header 165 which in turn is fed from a suitable source of concentrated sulfuric acid. In this manner, uniform dispersion of the sulfuric acid in the reaction slurry is provided so as to minimize localized areas of concentration of such acid, thereby acting to reduce excessive nucleation.

In accordance with an important aspect of the present invention, the freeboard space 166 above the body of reaction slurry communicates with a suitable vacuum source such as, for example, a barometric condenser 167 through an overhead line 168 to provide for controlled evaporative cooling of the reaction which is maintained in balance with the heat generated in the reaction slurry. Condenser 167 can be of conventional construction and, as such, would be provided with a cold water inlet 169, condensate outlet 170 and overhead outlet 171 for non-condensables.

In operation, combination reactor and cooler unit 141 operates in substantially the same manner as the previously described preferred embodiment of FIGURES 3 and 4. Ground phosphate rock is continuously fed to an outside mixing hopper 172 by means of a screw conveyor 173 while weak phosphoric acid is introduced through a side connection 174 for efficiently mixing the rock with the return acid to form a slurry which is discharged from the bottom of hopper 172 into an inlet 175 located in the lower portion of the unit 141. Inlet 175 is preferably located in the turbulent areas adjacent the impeller 150, 151 and 152 so as to provide intimate mixing of the incoming feed upon being immediately received in the interior of the unit 141. Concentrated sulfuric acid is simultaneously discharged on the circulating reaction slurry through overhead spray nozzles 162, 163 and 164.

Reaction slurry is continuously discharged through the unit 141 through a vertical side tube 176 having a bottom connection 177 which communicates with the reaction slurry below the normal operating liquid level and a top connection 178 which communicates with the freeboard space 166. A discharge conduit 179 communicates with suitable further processing means such as that described with the FIGURE 1 embodiment.

It will be appreciated, of course, that while three draft tubes are employed in the combination reactor and cooler unit 141 any number of such draft tubes may be used and that this embodiment is not limited to any specific number of draft tubes nor to any particular arrangement thereof.

FIGURES 7 and 8 generally illustrate a combination reactor and cooler unit 200 embodying principles of the present invention. This embodiment is similar to the previously described embodiment of FIGURES 5 and 6 with the exception that an integral generally U-shaped portion is substituted for the tapered draft tube arrangement of the previously described embodiment. As is generally shown, combination reactor and cooler unit 200 includes a generally rectangular cross-sectional body portion 201 which extends at its upper end into an inwardly tapered section 202 having a top cover member 203 integrally formed therewith. The lower end of midsection 201 extends into a pair of tapered portions 204 and 205 which communicate with each other through an integrally formed generally U-shaped portion 206. As is shown, an impeller 207 is supported and driven by a horizontal shaft 208 which is mounted at its opposite ends to combination bearing and sealing members 209 and 210. Reaction slurry in the combination reactor and cooler 200 is circulated in a continuous flow as is generally depicted by the arrows. In accordance with this invention, the rate of circulation of the reaction slurry in unit 200 is sufficient to provide for complete recirculation of the entire mass of reaction slurry at least once every five minutes. Stated otherwise, the mass velocity of the reaction slurry should be at least equal to 20% of the total mass of reaction slurry per minute. Preferably a mass velocity of from 100% to 200% of the mass of reaction slurry per minute is employed.

Concentrated sulfuric acid is discharged onto the circulating reaction slurry by a plurality of pressure nozzles 211 which can be supplied from a common header 212 which in turn is fed from a suitable source of such acid. In this manner, the concentrated acid is uniformly dispersed in the circulating slurry in a manner by which localized areas of increased calcium sulfate concentration are avoided, thereby preventing excessive nucleation. Vacuum cooling which is substantially in balance with the heat generated in the reaction slurry is provided by maintaining the freeboard space 213 above the mass of reaction slurry at subatmospheric pressures such as, for example, by communicating the freeboard space through a conduit 214 with a suitable vacuum source.

Phosphate rock and a phosphate rock slurry composed of weak phosphoric acid and ground phosphate rock is discharged under pressure into the system through a feed inlet 215 preferably located adjacent to and on the upstream side of impeller 207 so as to provide for uniform dispersing of these reactants in the mass of reaction slurry. Slurry level is maintained by a side tube member 216 which can be constructed and operated in substantially the same manner as vertical side tube member 176 in the previously described embodiment.

A further modified reactor and slurry cooler unit 225 embodying principles of the present invention is illustrated in FIGURES 9 and 10. This unit is generally constructed along the lines of the preferred embodiment of the invention previously described in connection with FIGURES 3 and 4. The principal distinctions between these embodiments, however, concerns the arrangement of draft tube 226 which, instead of being fixed to the interior of the combination reactor and slurry cooler unit 227, is welded or otherwise fixed to impeller 228 for co-rotation therewith.

As is shown, the combination reactor and cooler unit 227 generally includes a fixed diameter midsection 229 closed off at its upper end by a frusto-conical top 230 fitted with a combination seal and bearing member 231 which acts to journal the co-rotatable impeller 228 and draft tube 226. The lower end of fixed diameter 229 of the combination reactor cooler unit is likewise closed off by frusto-conical bottom member 232 equipped with a feed inlet 233 through which the phosphate rock-weak phosphoric acid slurry is introduced at a rate which enables these incoming reactants to be uniformly dispersed through the mass of reaction slurry contained in the unit 227. A plurality of vane members 234–237 are fixed to and spaced around the inner wall of fixed diameter midsection 229 to prevent circumferential movement of the mass of reaction slurry.

As is best shown in FIGURE 9, draft tube 226 can be provided with suitable support members in the form of radial spokes each of which being indicated by the reference numeral 238 which act to provide additional support for the relatively heavy draft tube member. The upper end of draft tube 226 preferably terminates slightly below the normal operating liquid level in the unit 227, however, as previously noted, a slight extension of this member above the liquid level enables operation in accordance with the principles of the present invention with the only disadvantage being somewhat increased power requirements.

A vacuum is maintained in the freeboard space 239 above the body of reaction slurry by providing an overhead line 240 which communicates with a suitable vacuum source.

In accordance with an important aspect of the present invention, concentrated sulfuric acid is discharged onto the rapidly circulating mass of reaction slurry through a plurality of overhead mounted spray heads each of which is indicated by the reference numeral 241. The sulfuric acid droplets from the spray heads 241 are thereby uniformly dispersed throughout the mass of circulating reaction slurry. At the same time, this acid spray acts to disperse and destroy any foam phase which would tend to exist above the slurry level. A vertical side tube member 242 constructed and operated substantially in accordance with the previously described vertical side tube member 176 of FIGURE 5 is provided to maintain liquid level control.

Operating of the combination reactor cooler unit 225 is substantially in accordance with the operation of the previously described emobdiments, such as set forth in connection with the description of the preferred embodiments of the present invention shown in FIGURES 3 and 4. In this regard, the preferred rotational speeds of the impellers and draft tube of this embodiment should be sufficient to provide for complete recirculation of the entire body of reaction slurry at least once every five minutes. Preferably a circulation flow rate of from 100% to 200% of the total mass of reaction slurry per minute in the flow pattern designated by the arrows in FIGURE 9 will provide substantial uniformity of temperature and concentration throughout the body of reaction slurry.

Figure 11:
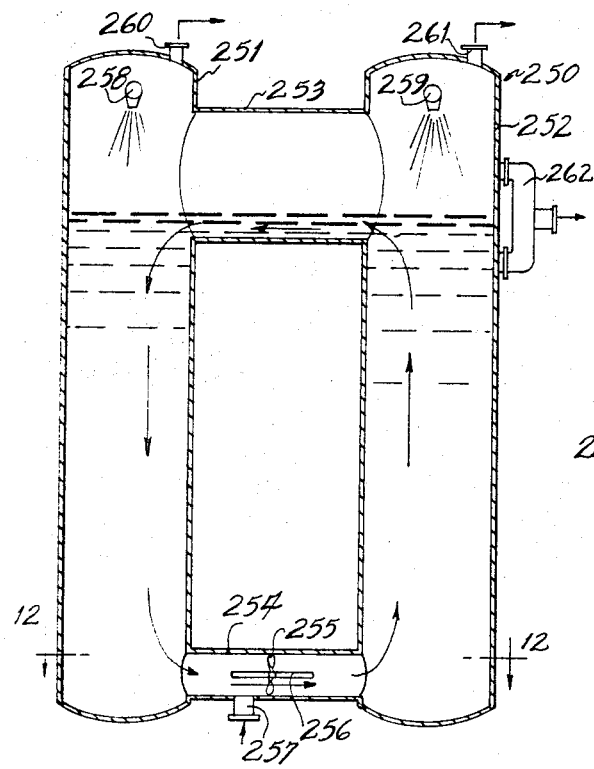
FIGURE 11 is a diagrammatic view of a further modified form of the combined reactor and cooler unit of the present invention.

FIGURES 11 and 12 generally illustrate a further embodiment of a combined reactor and cooler unit 250 which is formed from two or more vertically disposed column-like vessels 251 and 252. Each of these vessels can be shipped to the plant site and interconnected at such area through upper and lower communicating conduits of the type generally indicated by the reference numerals 253 and 254, respectively, thereby facilitating field fabrication. This particular embodiment also offers the additional advantage of enabling an increase in the capacity of the installation at a later date by attaching additional column-like vessels to the then existing unit. Also, the shape of these components in unit 250 facilitates the vulcanizing of a rubber lining to the interior thereof to reduce the total cost of initial installation.

The embodiment shown in FIGURES 11 and 12 is generally constructed and operated along the same principles as in the previously described emobdiments. In particular, an impeller 255 is mounted and driven by a shaft 256 in the lower intercommunicating conduit 254 for circulating the mass of reaction slurry through the combination reactor cooler unit 250 in a flow pattern generally depicted by the arrows. A ground phosphate rock-weak phosphoric acid feed is preferably introduced on the upstream side of the impeller 255 through a feed inlet 257 in order to facilitate uniform distribution of these reactants in the reaction slurry. Similarly, concentrated sulfuric acid is preferably discharged under pressure onto the surface of the circulating mass of reaction slurry through a plurality of pressure nozzles 258 and 259 each of which is mounted adjacent the upper portion of the column 251 and 252, respectively. Vacuum cooling is provided in the vessel by overhead vapor outlets 260 and 261, each of which communicates with a suitable separate or common vacuum source. As was noted in connection with the previously described embodiments, evaporative cooling of the mass of the reaction slurry is maintained substantially in balance with the heats of reaction developed in the reaction slurry so as to enable the maintenance of substantially isothermal conditions throughout the mass of reaction slurry. In accordance with the present invention, this evaporative cooling cooperates with the high circulation rate of the mass of reaction slurry to prevent the formation of localized areas of relatively high calcium sulfate supersaturation wherein an excessive number of nuclei will be formed. Liquid level is maintained in the unit 250 by the provision of a vertical side arm member 262 which is constructed and operated substantially in accordance with vertical side arm member 176 of FIGURE 5.

Figure 14:
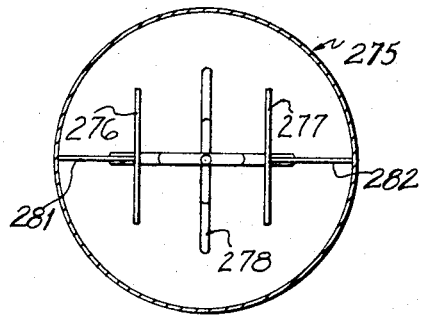
FIGURE 14 is a plan sectional view taken along the line 14—14 of the apparatus shown in FIGURE 13.
Figure 13:
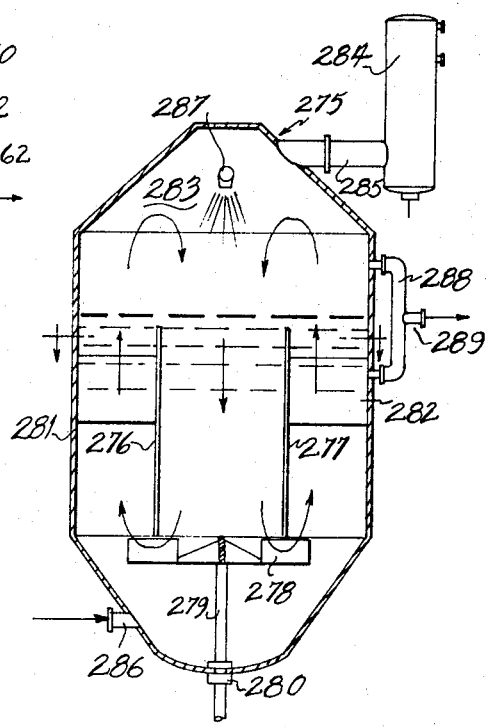
FIGURE 13 is a diagrammatic view of a further modified form of the combined reactor and cooler unit of the present invention wherein planar baffle members are substituted for the draft tube flow directing means of the preferred embodiment of this invention shown in FIGURES 3 and 4.

FIGURES 13 and 14 generally depict a combination reactor and cooler unit 275 embodying the principles of the present invention. This particular embodiment generally corresponds in construction to the previously described preferred embodiment of FIGURES 3 and 4 with the exception that a pair of vertically extending parallel baffle members 276 and 277 are substituted for the draft tube 104 of the FIGURE 3 embodiment. Also, an agitator 278 of a paddle-type construction is substituted for the propeller type impeller 106 and operates to provide an outward thrust to the reaction slurry thereby providing a flow path which is generally depicted by the arrows. Paddle-type impeller 278 is mounted to a drive shaft 279 which is journaled by a combination seal and bearing member 280. A plurality of vane members 281 and 282 are provided for preventing the mass of reaction slurry from rotating as a single body about the interior of the vessel 275. Evaporative cooling is provided in accordance with one aspect of the present invention by communicating the freeboard space 283 above the mass of reaction slurry with a suitable vacuum source 284, such as, for example, a barometric condenser, by means of an overhead connection 285.

Ground phosphate rock-weak phosphoric acid slurry feed is discharged under pressure into an inlet 286 located adjacent the lowermost portion of the combination reactor and cooler unit 275 adjacent the highly turbulent area of the rotating paddle-type impeller 278 for uniformly dispersing this reactant component throughout the mass of rapidly circulating reaction slurry. Similarly, concentrated sulfuric acid is preferably discharged onto the surface of the rapidly circulating reaction slurry in droplet form from an overhead spray head 287 for facilitating uniform dispersing of this reactant throughout the body of reaction slurry. A suitable vertical side arm control 288 can be used to maintain the liquid level in the unit 275 at a predetermined location. As was true of each of the previously described embodiments, reaction slurry removed through the slurry outlet 289 can be processed in accordance with the manner described in connection with the FIGURE 1 embodiment.

Combination reactor and cooler unit 275 operates in the same general manner as previously described in connection with the FIGURE 3 embodiment and thereby advantageously employs the "extended surface" principle for maintaining substantial uniformity of temperature and pressure conditions throughout the mass of reaction slurry in order to produce calcium sulfate crystals of improved filterability and washability.

Figure 15:
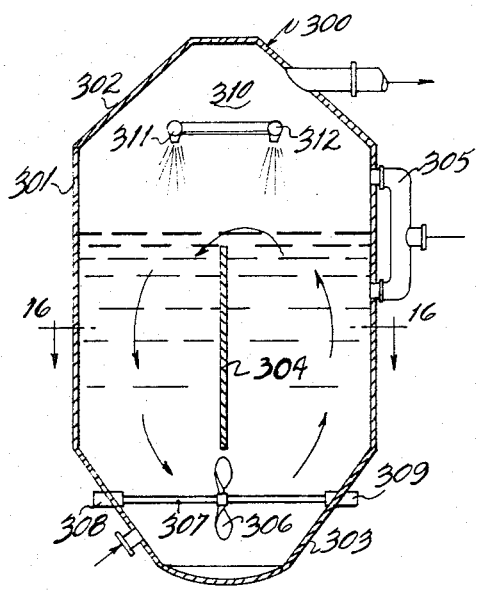
FIGURE 15 is a diagrammatic view of a further modified form of the preferred embodiment of the combined reactor and cooler unit of the present invention shown in FIGURES 3 and 4.
Figure 16:
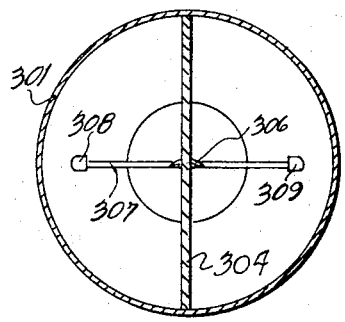
FIGURE 16 is a plan sectional view taken along the line 16—16 of the combined reactor and cooler unit shown in FIGURE 15.

FIGURES 15 and 16 illustrate a combination reactor and cooler unit 300 which is a modification of the embodiment described in FIGURES 13 and 14. In particular, unit 300 includes a closed shell or body 301 integrally formed at its upper end with a frusto-conical top 302 and at its lower end with a frusto-conical bottom 303. A single baffle 304 extends across the interior of vessel 301 and is fixed to the interior walls thereof by welding or other suitable means. The height of the baffle member 304 preferably terminates somewhat below the normal operating liquid level in the combination reactor and cooler unit 300 which level can be effectively maintained by suitable vertical side arm member 305. The lower end of baffle member 304 terminates adjacent the bottom of the shell member 301 at a location which affords minimized power requirements without incurring short circuiting of the flow of reaction slurry. In this particular embodiment an impeller 306 is mounted to a horizontally aligned drive shaft 307 journaled in a pair of combination seal and bearing members 308 and 309. Impeller 306 imparts a horizontal thrust to the mass of reaction slurry and thereby eliminates the need for vanes of the type designated by the reference numerals 281 and 282 in the previously described embodiment. The reaction slurry is circulated through the vessel at a rate sufficient to provide for uniformity of concentration and temperature throughout the mass of reaction slurry. The freeboard space 310 above the mass of reaction slurry communicates with a suitable vacuum source to provide for evaporative cooling which is maintained substantially in balance with the heats of reaction developed in the slurry mass. Concentrated sulfuric acid is discharged onto the mass of reaction slurry through a plurality of spray heads 311, 312 to facilitate intimate and uniform mixing thereof with the reaction slurry. Simultaneously, a ground phosphate rock-weak phosphoric acid slurry is discharged into the lower portion of the combination reactor and cooler unit 300 preferably at a location adjacent the upstream side of impeller 306 so as to provide uniform dispersing of these reactants.

Circulating rates for the reaction slurry and other operating conditions are substantially in accordance with those discussed in the previously mentioned embodiments.

Figure 18:
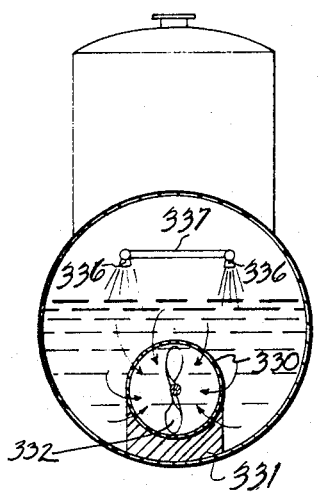
FIGURE 18 is a vertical sectional view of the combined reactor and cooler unit shown in FIGURE 17.
Figure 17:
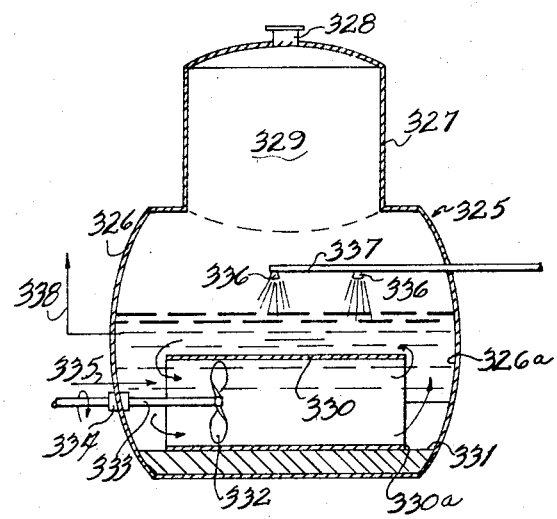
FIGURE 17 is a diagrammatic view of a further embodiment of the combined reactor and cooler unit embodying principles of the present invention wherein a horizontally aligned draft tube is employed.

FIGURES 17 and 18 illustrate a further modified reactor and cooler unit 325 embodying the principles of the present invention. In particular, reactor cooler unit 325 includes a lower body portion 326 and a centrally disposed and upwardly extending integrally formed domed portion 327 having an outlet 328 which communicates with a suitable vacuum source for maintaining vacuum conditions in the freeboard space 329 above the mass of reaction slurry contained in the lower body portion 326. Flow control means is provided in this embodiment by a horizontally disposed draft tube 330 which is mounted to a saddle-type support member 331. An impeller 332 mounted to a drive shaft 333, journaled in a combination bearing and seal member 334, operates to rapidly circulate the reaction slurry through the flow control means or draft tube 330. In this regard, the mass velocities of reaction slurry set out in connection with the preferred embodiment of the present invention also apply to the presently described embodiment.

A ground phosphate rock-dilute phosphoric acid slurry is fed into the combination reactor and cooler unit 325 at a location adjacent the upstream side of impeller 332 as is generally depicted by the reference numeral 335. Simultaneously, concentrated sulfuric acid is discharged onto the rapidly circulating mass of reaction slurry through a plurality of spray heads 336 supplied through a common header 337 which communicates with a suitable concentrated sulfuric acid supply source. Reaction slurry is drawn off as generally depicted by the reference numeral 338 for further processing in the manner described in connection with the embodiment of FIGURE 1.

In accordance with an important aspect of the present invention, evaporative cooling of the mass of reaction slurry is maintained substantially in balance with the heats of reaction developed in the combination reactor and cooler unit 325 for maintaining the mass of reaction slurry at a substantially uniform temperature throughout in order to avoid localized areas wherein an excessive number of nuclei are formed. In this regard, the dispersing of the concentrated sulfuric acid onto the rapidly circulating reaction slurry also functions to avoid excessive localized nucleation by uniformly dispersing concentrated sulfuric acid throughout the reaction slurry.

Draft tube 330 should be sized to provide an advantageous balance between the flow direction reqirements of the system and horsepower requirements for circulating the mass of reaction slurry. In this regard, it is preferred that the downstream end 330a of draft tube 330 be spaced from the inner end wall 326a of the lower portion of reaction vessel 326 a distance of approximately one-half the impeller diameter. Extending the draft tube closer to such end wall will result in an increase in horsepower requirements while a shortening of the draft tube will produce an increase in short circuiting of the mass of reaction slurry.

The combination reactor and cooler unit 325 operates in substantially the same manner as described in connection with the previously referred to embodiments to provide the "extended surface" principle for maintaining uniformity of concentration and temperatures throughout the mass of reaction slurry. In this regard, it will be appreciated that while in this particular embodiment a single horizontally aligned draft tube 330 is provided, a multiple of such draft tubes may be so employed where the volume of reaction slurry necessitates the provision of additional flow control means.

Figure 19:
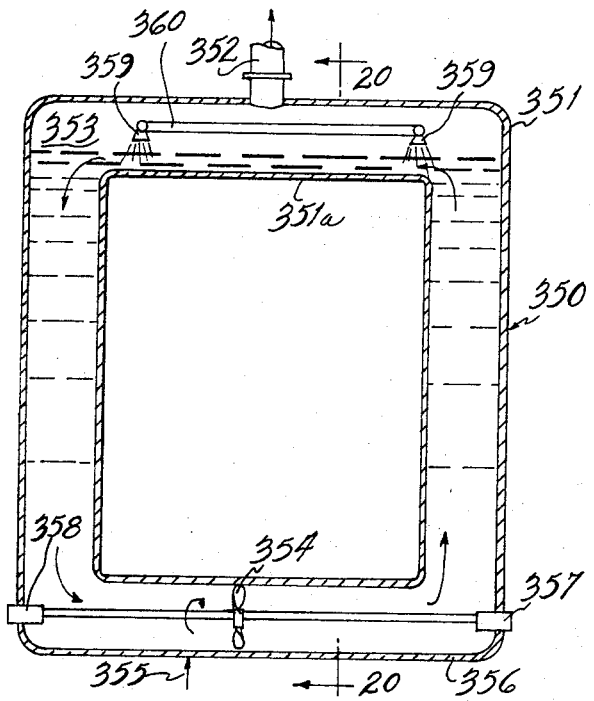
FIGURE 19 is a diagrammatic view of a further modified combination reactor and cooler unit embodying principles of the present invention.
Figure 20:
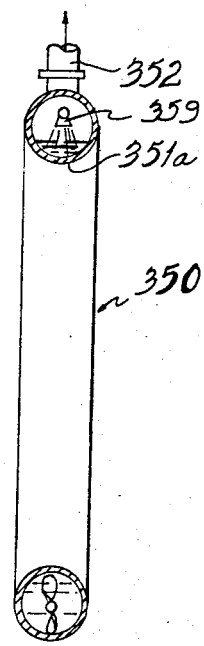
FIGURE 20 is a vertical sectional view of the reactor and cooler unit shown in FIGURE 19.

FIGURES 19 and 20 illustrate a loop shaped combination reactor and cooler unit 350 which operates in subsantially the manner described in connection with the previously referred to embodiments. Unit 350 includes a loop shaped body portion 351 which is provided with an overhead outlet 352 communicating with a suitable vacuum source for maintaining vacuum conditions in the freeboard space 353. A ground phosphate rock-weak phosphoric acid slurry is preferably introduced at a location immediately adjacent and upstream from an impeller 354 as is generally depicted by the reference numeral 355. Impeller 354 driven by shaft 356 operates to circulate the mass of reaction slurry throughout the body of the vessel 351. Shaft 356 is journaled by a pair of combination seal and bearing members 357 and 358. Concentrated sulfuric acid is preferably discharged onto the rapidly circulating mass of reaction slurry from a plurality of spray heads 359 which communicate with a header member 360 supplied from a suitable concentrated sulfuric acid source.

The mass velocity of the reaction slurry in the loop shaped body portion 351 is substantially as described in connection with the preferred embodiment of the present invention, viz the circulation rate should be sufficient to enable complete recirculation of the mass of reaction slurry at least once every five minutes. In this regard, however, somewhat more rapid mass circulating rates in the order of from 100% to 200% of the mass reaction slurry per minute are preferred.

Suitable level control means, such as are well known in the art, can be provided in the closed loop arrangement to maintain the level of the circulating mass of reaction slurry at the preferred height. In this regard, however, it will be apparent that in order to enable complete recirculaiton of the reaction slurry in the looped flow path generally depicted by the arrows it is essential that the reaction slurry have a level above the lower portion 351a of the combination reactor and cooler body 351.

Operation of the combination reactor and cooler unit 350 is substantially in accordance with that described in accordance with the previously referred to preferred embodiment of the present invention. In this regard, it should be appreciated that the instant embodiment offers the advantage of an unusually efficient flow direction which is characterized by a virtual avoidance of stagnant areas wherein excessive nucleation could develop.

Figure 22:
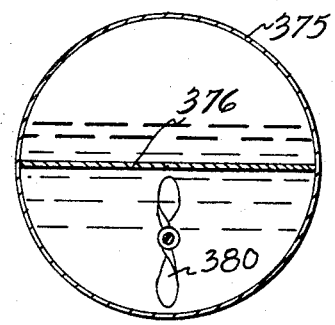
FIGURE 22 is a vertical sectional view of the apparatus shown in FIGURE 21.
Figure 21:
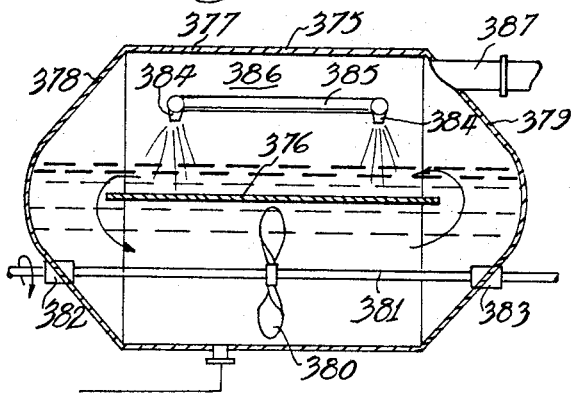
FIGURE 21 is a diagrammatic view of a further embodiment of the combined reactor and cooler unit of the present invention.

FIGURES 21 and 22 illustrate a further modified combination reactor and slurry cooler unit 375 which is somewhat comparable to the combination reactor and slurry cooler unit 300 described in connection with the embodiments shown in FIGURES 15 and 16. The unit 375 of the present embodiment, however, differs from the unit 300 in that a horizontally disposed baffle plate 376 is employed as compared to the vertically disposed baffle plate 304 of the previously described embodiment. Combination reactor and cooler unit 375 includes a generally elongated fixed diameter midsection 377 which is terminated at its outer end by a pair of oppositely disposed generally dome-shaped end walls 378 and 379 integrally formed therewith. A suitable flow imparting means is provided by impeller 380 mounted to a drive shaft 381 which is journaled in a pair of combination seal and bearing members 382 and 383 of known construction. Shaft 381 is driven by a suitable drive means and operates to turn the propeller at a velocity sufficient to impart to the body of reaction slurry a fluid flow rate sufficient to provide complete recirculation of the entire body of reaction slurry at least once every five minutes. A ground phosphate rock-weak phosphoric acid slurry is preferably discharged on the upstream side of the impeller 380 at a location sufficiently close to the impeller so as to enable uniform and thorough dispersing of these reactants. Simultaneously, concentrated sulfuric acid is preferably introduced onto the reaction mass from a plurality of overhead spray nozzles 384 which can be supplied by a common header 385 which communicates with a suitable supply source.

In accordance with an important aspect of the present invention, evaporative cooling of the mass of the reaction slurry is maintained substantially in balance with the heats generated in the reaction slurry by providing a vacuum cooling. This is accomplished by communicating the freeboard space 386 through a suitable conduit 387 to a vacuum source such as, for example, a barometric condenser.

As is best shown in FIGURE 22, horizontally aligned baffle member 376, in the preferred form of this embodiment, extends across the entire cross-section of the body 375 in order to minimize short circuiting of the fluid flow and thereby effectively maintain the fluid flow in the flow pattern generally depicted by the arrows (FIGURE 20). Rapid circulation of the reaction slurry in combination with evaporative cooling which is maintained in balance with the heats of reatcion developed in the body of the reaction slurry operate to substantially maintain uniform temperatures throughout the reaction slurry and uniformity of concentration of the reactants for effectively maintaining substantially uniform supersaturation of calcium sulfate throughout the mass of reaction slurry and thereby minimize the formation of gypsum nuclei. As such, the gypsum crystals produced in the wet process manufacture of phosphoric acid in this unit, as well as all of those previously described, are characterized by a substantially improved washability and filterability to an extent heretofore unobtainable in conventional reactors.

Modifications and variations from the heretofore described embodiments will be apparent to those skilled in this art. Accordingly, this invention is to be limited only by the scope of the appended claims.

I claim:

1. The process of making aqueous phosphoric acid from reactants which include phosphate rock, sulfuric acid, and water, said process comprising the steps of: continuously adding said reactants to a body of reaction slurry contained in a combination reactor and cooler unit in amounts which enable production of the desired quantity of aqueous phosphoric acid, said reactants upon being combined in said body of reaction slurry generating heat from exothermic reactions which occur therein; continuously exposing the surface of said body of reaction slurry in said combination reactor and cooler unit to a subatmospheric pressure to induce evaporative cooling of said body of reaction slurry at a rate which is maintained substantially equal to the rate at which said heat is generated from said exothermic reactions; continuous circulating substantially the entire body of said reaction slurry in said combination reactor and cooler unit in a flow pattern adapted to expose the entire body of reaction slurry to said subatmospheric pressure, said rate of circulation of said body of reaction slurry being at least sufficient to maintain substantial uniformity of temperature and concentration throughout the body of said reaction slurry; and, continuously withdrawing a portion of said reaction slurry from said combination reactor and cooler unit; whereby, a substantially uniform level of calcium sulfate supersaturation is maintained throughout said body of reaction slurry for producing calcium sulfate crystals exhibiting improved washability and filterability properties.

2. The process of claim 1 wherein said rate of circulation of said body of reaction slurry is at least equal to 20% of the total mass of said reaction slurry per minute whereby complete recirculation of substantially the entire body of said reaction slurry is effected at least once every five minutes.

3. The process of claim 1 wherein said rate of circulation of said body of reaction slurry ranges from approximately 100% to 200% of the total mass of said reaction slurry per minute.

4. The process of claim 1 wherein said body of reaction slurry is maintained at a substantially uniform temperature characterized by a localized temperature variation which substantially does not exceed the average bulk temperature thereof by more than 1° F.

5. The process of claim 1 wherein said reactants include phosphate rock, sulfuric acid, and dilute phosphoric acid.

6. The process of claim 1 wherein said sulfuric acid is sprayed onto the circulating body of said reaction slurry to provide substantially immediate and uniform dispersing of said acid throughout said body of reaction slurry.

7. In the manufacture of phosphoric acid by the wet process from reactants which include phosphate rock, sulfuric acid and water, the improvement which comprises: introducing said reactants into a combination reactor and cooler unit containing a relatively large body of reaction slurry and comprising a top enclosure means for providing an enclosed freeboard space above the body of reaction slurry, flow directing means disposed within said body of reaction slurry and forced circulation means associated with said flow directing means for continuously circulating substantially the entire body of said reaction slurry in a flow pattern adapted to expose substantially the entire body of said reaction slurry to said freeboard space above said body of reaction slurry, said reactants upon being introduced into said reaction slurry generating heat from exothermic reactions which occur in said body of reaction slurry; continuously circulating substantially said entire body of reaction slurry at a flow rate at least equal to 20% of the total mass of said body of reaction slurry per minute, continuously removing heat from said reaction slurry by vaporizing a portion of said reaction slurry in the freeboard space above said body of reaction slurry at a rate which is maintained substantially in balance with the rate at which said heat is generated from said exothermic reactions; and, continuously withdrawing a portion of said reaction slurry from said body; whereby, substantial uniformity of temperature and concentration throughout said body of reaction slurry is maintained for providing substantial uniformity of calcium sulfate supersaturation throughout said body of reaction slurry.

8. The improvement of claim 7 wherein said rate of circulation of said body of reaction slurry ranges from approximately 100% to 200% of the total mass of said body of reaction slurry per minute.

9. The improvement of claim 7 wherein said circulation means is provided with a configuration which imparts a generally toroidal flow pattern to said circulating body of reaction slurry.

10. The improvement of claim 7 wherein said rate of circulation and heat removal cooperate to maintain a maximum differential temperature throughout said body of reaction slurry within said reactor and cooler unit which does not exceed the average bulk temperature thereof by more than 1° F.

11. The improvement of claim 7 wherein said reactants include phosphate rock, sulfuric acid and weak phosphoric acid.

12. The improvement of claim 11 wherein said reactants are introduced into said body of reaction slurry at locations remote from the place where the reaction slurry is withdrawn.

13. The improvement of claim 7 wherein phosphate rock is premixed with weak phosphoric acid and the resultant slurry introduced adjacent the bottom of said combination reactor and cooler unit.

14. The improvement of claim 7 wherein sulfuric acid is sprayed into said freeboard space and onto the surface of said circulating body of reaction slurry at a rate which enables substantially immediate and uniform dispersing of said sulfuric acid through said body of reaction slurry.

15. The improvement of claim 7 wherein a sufficient excess of sulfuric acid is introduced to maintain approximately 2% free sulfuric acid in the withdrawn reaction slurry.

16. In the manufacture of phosphoric acid by the wet process from reactants which include phosphate rock, sulfuric acid and water, the improvement which comprises: introducing the reactants into a combination reactor and cooler unit containing a relatively large body of reaction slurry and comprising a top enclosure means for providing an enclosed freeboard space above the body of reaction slurry which enclosed freeboard space communicates with a suitable vacuum source, an upright draft tube disposed within the body of reaction slurry and forced circulation means associated with said draft tube for creating and maintaining a generally toroidal flow pattern in said combination reactor and cooler unit whereby said upright draft tube and circulating means cooperate in continuously circulating substantially the entire body of said reaction slurry in a flow pattern adapted to expose essentially the entire body of said reaction slurry to the subatmospheric pressure maintained in said freeboard space; continuously withdrawing a portion of said reaction slurry from reactor and cooler unit to balance the input of reactants therein; continuously circulating said body of reaction slurry in said generally toroidal flow pattern at a rate which is at least sufficient to provide complete recirculation of substantially the entire body of reaction slurry every five minutes; and, removing heat from said reaction slurry by vaporizing a portion thereof in said freeboard space above the body of said reaction slurry at a rate which is maintained substantially equal to the rate at which heat is generated from exothermic reactions which occur in said body of reaction slurry; whereby, said rate of circulation of said reaction slurry in said generally toroidal flow pattern cooperates with said rate of evaporative cooling to provide a substantially uniform temperature and concentration throughout said body of reaction slurry for providing a substantially uniform level of calicum sulfate supersaturation therein.

17. The improvement of claim 16 wherein said rate of circulation of said body of reaction slurry ranges from approximately 100% to 200% of the total mass of said reaction slurry per minute.

18. The improvement of claim 16 wherein said concentrated sulfuric acid is sprayed into said freeboard space and onto said body of circulating reaction slurry for substantially immediately uniformly dispersing said sulfuric acid throughout said body of reaction slurry.

19. The improvement of claim 16 wherein ground phosphate rock is premixed with weak phosphoric acid and discharged under pressure into said body of reaction slurry at a location adjacent said circulating means for providing rapid and uniform dispersing of said reactants throughout the entire body of said reaction slurry.

20. Apparatus for continuously reacting phosphate rock and sulfuric acid to produce phosphoric acid and calcium sulfate by the wet process, said apparatus comprising a combination reactor and cooler unit adapted to contain a body of reaction slurry, said combination reactor and cooler unit being at least partially enclosed to define a freeboard space above the reaction slurry level for release of vapor therefrom, a vacuum source communicating with said freeboard space for maintaining therein a predetermined subatmospheric pressure, flow directing means mounted within said combination reactor and cooler unit, forced circulation means for circulating said body of reaction slurry in a flow pattern adapted to expose substantially the entire body of said reaction slurry to said subatmospheric pressure maintained in said freeboard space at a rate sufficient to provide for complete recirculation of said entire body of reaction slurry at least once every five minutes, means for substantially continuously adding phosphate rock and sulfuric acid to said body of reaction slurry and outlet means for withdrawing reaction slurry from said reactor and cooler unit.

21. The apparatus of claim 20 wherein said flow directing means comprises a draft tube.

22. The apparatus of claim 20 wherein said draft tube is mounted so that the ends thereof lie in a generally vertical axis with respect to said combination reactor and cooler unit.

23. The apparatus of claim 22 wherein the top of said vertically aligned draft tube is positioned adjacent the normal operating reaction slurry level in said combination reactor and cooler unit.

24. The apparatus of claim 20 wherein said draft tube is mounted so that the open ends thereof lie in a generally horizontal axis with respect to said combination reactor and cooler unit.

25. The apparatus of claim 20 wherein said flow directing means comprises a planar baffle member.

26. The apparatus of claim 20 wherein said planar baffle member is egnerally vertically aligned.

27. The apparatus of claim 20 wherein said planar baffle member is generally horizontally aligned.

28. The apparatus of claim 20 wherein spray means is provided in the freeboard space above said body of reaction slurry for introducing sulfuric acid into the freeboard space above said reaction slurry in a finely divided particulate form which enables immediate and uniform dispersing of said sulfuric acid throughout said circulating body of reaction slurry.

29. The apparatus of claim 20 wherein said combination reactor and cooler unit comprises a vessel having an integrally formed generally U-shaped portion positioned below the normal operating level of said body of reaction slurry in said unit and through which said body of reaction slurry is circulated.

30. A combination reactor and cooler unit wherein the continuous reaction between phosphate rock and sulfuric acid may be carried out substantially isothermally comprising, a closed tank, a column the upper end of which is closed and provided with a vacuum connection supported above the tank with the bottom end of the column being open and dipping below the normal liquid level within the tank, an open-ended draft tube disposed within said column with the upper end thereof not extending above the normal operating liquid level in the column and with the lower end projecting from said column and spaced from the tank bottom, circulating means associated with said draft tube for creating and maintaining a generally toroidal flow pattern whereby at least a substantial portion of the liquid contents within said unit flows through said draft tube in one direction and through the annular space between said draft tube and said column in the opposite direction, and means for rapidly dispersing phosphate rock into the contents of said tank comprising a sleeve member dipping below the normal liquid level in said tank and an agitator disposed within said sleeve below said level.

31. The combination reactor and cooler unit of claim 30 wherein said tank has an outlet for withdrawing reaction slurry at a place remote from said sleeve member.

32. The combination reactor and cooler unit of claim 30 wherein said column is disposed adjacent one side of said tank and the lower projecting end of said draft tube is curved so as to open over approximately the center of the bottom of said tank.

33. Apparatus for isothermally reacting phosphate rock and sulfuric acid in the wet process of making phosphoric acid which comprises: an enclosed isothermal reactor-cooler unit adapted to be operated with a freeboard space; a vapor condenser having its vapor intake connected with said freeboard space; a pre-mixer in which phosphate rock may be slurried with weak phosphoric acid; slurry conduit means connecting between said premixer and said reactor-cooler unit adjacent the bottom thereof; and spray means for introducing sulfuric acid into said freeboard space; said isothermal reactor-cooler unit comprising an enclosed vessel, an upright draft tube disposed within said vessel with the upper end positioned somewhat below the normal liquid operating level therein, forced circulation means in association with said draft tube for creating and maintaining a toroidal flow pattern within a body of reaction slurry within said unit and whereby at least a substantial portion of said body of reaction slurry flows through said draft tube in one direction and returns on the exterior in the opposite direction, and outlet means for withdrawing reaction slurry from said unit.

34. A combination reactor and cooler unit wherein the continuous reaction between phosphate rock, sulfuric acid and water may be carried out substantially isothermally comprising: a tank, a column the upper end of which is closed and communicates with a vacuum source, the bottom end of said column being open and dipping below the normal liquid level within said tank, flow directing means disposed within said column, forced circulating means associated with said flow directing means for creating and maintaining a flow pattern whereby substantially the entire liquid contents within said unit can be exposed to subatmospheric pressures maintained in the upper end of said column, means for introducing sulfuric acid into the contents of said unit, and means for rapidly dispersing phosphate rock into the contents of said tank comprising a sleeve member dipping below the normal liquid level in said tank and an agitator disposed within said sleeve member below said level.

35. The combination reactor and cooler unit of claim 34 wherein said flow direction means comprises a draft tube.

36. The combination reactor and cooler unit of claim 34 wherein said means for introducing sulfuric acid into said unit comprises at least one spray nozzle which is disposed in the upper end of said column.

37. Apparatus for isothermally reacting phosphate rock and sulfuric acid in the wet process of making phosphoric acid which comprises: an enclosed isothermal combination reactor and cooler unit adapted to be operated with a freeboard space; a vacuum source connected with said freeboard space; a pre-mixer in which phosphate rock may be slurried with weak phosphoric acid; slurry conduit means connecting said pre-mixer with said combination reactor and cooler unit adjacent the bottom of said unit; spray means for introducing sulfuric acid into said unit; said isothermal reactor and cooler unit comprising an enclosed vessel, flow directing means and forced circulation means; said flow directing means and forced circulation means being disposed with respect to each other to provide a flow pattern for liquid contents within said unit whereby substantially the entire liquid contents will be exposed to said freeboard space; and outlet means for withdrawing reaction slurry from said unit.

38. The apparatus of claim 37 wherein said flow directing means is a draft tube.

References Cited

UNITED STATES PATENTS

| | | | |
|---|---|---|---|
| 1,971,563 | 8/1934 | Hirschkind et al. | 23—1 |
| 2,109,347 | 2/1938 | Beekhuis | 23—1 |
| 3,071,447 | 1/1963 | Bernhardi | 23—285 X |
| 3,181,931 | 5/1965 | Weber | 23—165 |
| 3,292,999 | 12/1966 | Chirico | 23—273 |

FOREIGN PATENTS 453,582     1936     Great Britain.

OSCAR R. VERTIZ, *Primary Examiner.*

A. GREIF, *Assistant Examiner.*

U.S. Cl. X.R.

23—259.2, 273

PO-1050
(5/69)

UNITED STATES PATENT OFFICE
CERTIFICATE OF CORRECTION

Patent No. 3,416,889        Dated December 17, 1968

Inventor(s) Harold B. Caldwell

It is certified that error appears in the above-identified patent and that said Letters Patent are hereby corrected as shown below:

In Column 2, line 63, "heretobefore" should read --heretofore--

Column 7, line 11, "mediatel" should read --mediate--

Column 14, line 34, "Operating" should read --Operation--

Column 14, line 66, "emobdiments" should read --embodiments--

Column 15, line 6, "vessel" should read --vessels--

Column 17, line 33, "santially" should read --stantially--

Column 18, line 46 "reatcion" should read --reaction--

Column 19, line 2, "continuous" should read --continuously--

Column 20, line 46, after "from" insert --the--

Column 20, line 62, "calicum" should read --calcium--

Column 21, line 43, "egnerally" should read --generally--

Columns 23 and 24, the following references should be included in the listing of "References Cited":

| 2,950,171 | 8/1960 | Macq | 23-165 |
| 3,257,168 | 6/1966 | Chelminski | 23-165 |

SIGNED AND
SEALED

MAR 3 - 1970

(SEAL)
Attest:

Edward M. Fletcher, Jr.
Attesting Officer

WILLIAM E. SCHUYLER, JR
Commissioner of Patents